(12) United States Patent
Embury et al.

(10) Patent No.: US 8,697,166 B2
(45) Date of Patent: Apr. 15, 2014

(54) METHOD FOR BAKING A CASSEROLE USING STEAM

(75) Inventors: Karen M. Embury, Saint Joseph, MI (US); Joel M. Sells, Coloma, MI (US); Jason R. Savage, Saint Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 481 days.

(21) Appl. No.: 12/729,514

(22) Filed: Mar. 23, 2010

(65) Prior Publication Data

US 2010/0178395 A1    Jul. 15, 2010

Related U.S. Application Data

(63) Continuation of application No. 11/945,219, filed on Nov. 26, 2007, now abandoned.

(51) Int. Cl.
*A23P 1/00*    (2006.01)
(52) U.S. Cl.
USPC ......................................................... 426/510
(58) Field of Classification Search
USPC ......................................................... 426/510
See application file for complete search history.

(56) References Cited

U.S. PATENT DOCUMENTS

| | | | |
|---|---|---|---|
| 4,010,349 A | 3/1977 | Lee | |
| 4,245,148 A * | 1/1981 | Gisske et al. | 219/492 |
| 4,876,426 A * | 10/1989 | Smith | 219/684 |
| 4,924,072 A * | 5/1990 | Oslin | 219/401 |
| 5,653,919 A | 8/1997 | White et al. | |
| 6,040,564 A | 3/2000 | Ueda et al. | |
| 6,323,467 B1 * | 11/2001 | Alsafadi | 219/480 |
| 6,521,871 B1 * | 2/2003 | Shelton | 219/401 |
| 6,972,397 B2 | 12/2005 | Ha | |
| 7,060,941 B1 * | 6/2006 | Embury et al. | 219/401 |
| 7,208,701 B2 | 4/2007 | Fraccon et al. | |
| 7,537,004 B2 | 5/2009 | Reay | |
| 7,745,763 B2 | 6/2010 | Fraccon et al. | |
| 7,867,534 B2 | 1/2011 | Sells et al. | |
| 2005/0006382 A1 | 1/2005 | Hayakawa et al. | |
| 2006/0249136 A1 | 11/2006 | Reay | |
| 2006/0249137 A1 | 11/2006 | Reay | |
| 2006/0251784 A1 * | 11/2006 | Sells et al. | 426/510 |
| 2006/0251785 A1 | 11/2006 | Fraccon et al. | |
| 2006/0289438 A1 | 12/2006 | Fraccon et al. | |
| 2007/0062927 A1 | 3/2007 | Sells et al. | |
| 2007/0104844 A1 | 5/2007 | Fraccon et al. | |

(Continued)

FOREIGN PATENT DOCUMENTS

| | | | | |
|---|---|---|---|---|
| AU | 17434/99 | * | 7/1999 | A21B 1/40 |
| BR | PI0601034 A | | 12/2006 | |

(Continued)

OTHER PUBLICATIONS

Lazy Day Brunch Casserole (Crustless Quiche), Food.com, [on line] Jan. 5, 2005, retrieved on May 6, 2012. Retrieved from the Internet: URL<http://www.food.com/recipe/lazy-day-brunch-casserole-crustless-quiche-107697>.*

*Primary Examiner* — Rena Dye
*Assistant Examiner* — Chaim Smith (57) ABSTRACT

A method of operating a household oven to bake a casserole with the introduction of steam and controlling the steam to maintain a predetermined level of humidity to control the level of browning of the casserole.

20 Claims, 9 Drawing Sheets

(56) References Cited

U.S. PATENT DOCUMENTS

| | | |
|---|---|---|
| 2008/0095905 A1 | 4/2008 | Sells et al. |
| 2009/0133684 A1 | 5/2009 | Embury et al. |
| 2009/0136640 A1 | 5/2009 | Embury et al. |
| 2011/0068093 A1 | 3/2011 | Sells et al. |

FOREIGN PATENT DOCUMENTS

| | | | | |
|---|---|---|---|---|
| BR | PI0601041 A | 12/2006 | | |
| BR | PI0601130 A | 12/2006 | | |
| BR | PI0601196 A | 12/2006 | | |
| BR | PI0601213 A | 12/2006 | | |
| BR | PI0601334 A | 12/2006 | | |
| BR | PI0601214 A | 3/2007 | | |
| BR | PI0601331 A | 8/2007 | | |
| CA | 2524764 A1 | 10/2006 | | |
| CA | 2524583 A1 | 11/2006 | | |
| CA | 2524597 A1 | 11/2006 | | |
| CA | 2524757 A1 | 11/2006 | | |
| CA | 2524763 A1 | 11/2006 | | |
| CA | 2524766 A1 | 11/2006 | | |
| CA | 2524604 A1 | 1/2007 | | |
| CA | 2534521 A1 | 3/2007 | | |
| CN | 1928426 A | 3/2007 | | |
| DE | 103 35 295 | * 3/2005 | ............... | A21B 3/04 |
| EP | 1714555 A2 | 10/2006 | | |
| EP | 1719414 A2 | 11/2006 | | |
| EP | 1719415 A2 | 11/2006 | | |
| EP | 1719417 A2 | 11/2006 | | |
| EP | 1724529 A1 | 11/2006 | | |
| EP | 1724530 A1 | 11/2006 | | |
| EP | 1744104 A1 | 1/2007 | | |
| EP | 1761111 A2 | 3/2007 | | |
| KR | 20060110746 A | 10/2006 | | |
| KR | 20060115327 A | 11/2006 | | |
| KR | 20060115329 A | 11/2006 | | |
| KR | 20060115332 A | 11/2006 | | |
| KR | 20060115333 A | 11/2006 | | |
| KR | 20060115579 A | 11/2006 | | |
| KR | 20070007701 A | 1/2007 | | |
| KR | 20070027429 A | 3/2007 | | |
| MX | PA05013410 A | 1/2007 | | |
| MX | PA06003631 A | 3/2007 | | |
| WO | 9933347 A1 | 7/1999 | | |

* cited by examiner

| Stage | Time (minutes) | Temperature (°F) | Upper Heating Element Duty Cycle | Lower Heating Element Duty Cycle | Convection Fan | Boiler Duty Cycle |
|---|---|---|---|---|---|---|
| 1 | 4 | 212 | 65 | 100 | On | 0 |
| 2 | 6 | 250 | 35 | 65 | On | 80 |
| 3 | 6 | Set temperature | 35 | 65 | On | 80 |
| 4 | Variable | Set temperature | 35 | 65 | On | 80 |

Fig. 6

| Stage | Time (minutes) | Temperature (°F) | Upper Heating Element Duty Cycle | Lower Heating Element Duty Cycle | Convection Fan | Boiler Duty Cycle |
|---|---|---|---|---|---|---|
| 1 | 4 | 212 | 65 | 100 | On | 0 |
| 2 | 6 | 250 | 35 | 65 | On | 100 |
| 3 | 6 | Set temperature | 35 | 65 | On | 100 |
| 4 | Variable | Set temperature | 35 | 65 | On | 100 |

Fig. 7

Cheddar

| Steam Duty Cycle | Dry Bulb Temperature | Wet Bulb Temperature | Delta | Level of Browning |
|---|---|---|---|---|
| 80% | 300°F | 205°F | 105°F | 12 |
| | 337.5°F | 197.5°F | 140°F | 13 |
| | 375°F | 195°F | 180°F | 14 |
| 100% | 300°F | 195°F | 95°F | 11 |
| | 337.5°F | 207.5°F | 130°F | 13 |
| | 375°F | 205°F | 170°F | 15 |

Fig. 8

Mozzerella

| Steam Duty Cycle | Dry Bulb Temperature | Wet Bulb Temperature | Delta | Level of Browning |
|---|---|---|---|---|
| 80% | 300°F | 205°F | 105°F | 16 |
| | 337.5°F | 197.5°F | 140°F | 16.5 |
| | 375°F | 195°F | 180°F | 17.5 |
| 100% | 300°F | 195°F | 95°F | 16 |
| | 337.5°F | 207.5°F | 130°F | 16.5 |
| | 375°F | 205°F | 170°F | 17 |

Fig. 9

Parmesan

| Steam Duty Cycle | Dry Bulb Temperature | Wet Bulb Temperature | Delta | Level of Browning |
|---|---|---|---|---|
| 80% | 300°F | 205°F | 105°F | 15 |
| | 337.5°F | 197.5°F | 140°F | 15.5 |
| | 375°F | 195°F | 180°F | 15.5 |
| 100% | 300°F | 195°F | 95°F | 13 |
| | 337.5°F | 207.5°F | 130°F | 15.5 |
| | 375°F | 205°F | 170°F | 16 |

Fig. 10

Reduced Fat

| Steam Duty Cycle | Dry Bulb Temperature | Wet Bulb Temperature | Delta | Level of Browning |
|---|---|---|---|---|
| 80% | 300°F | 205°F | 105°F | 4 |
| | 337.5°F | 197.5°F | 140°F | 4 |
| | 375°F | 195°F | 180°F | 4 |
| 100% | 300°F | 195°F | 95°F | 4 |
| | 337.5°F | 207.5°F | 130°F | 4 |
| | 375°F | 205°F | 170°F | 4 |

METHOD FOR BAKING A CASSEROLE USING STEAM

CROSS-REFERENCE TO RELATED APPLICATION

This application is a continuation of U.S. patent application Ser. No. 11/945,219, filed Nov. 26, 2007, which is incorporated herein by reference in its entirety.

BACKGROUND OF THE INVENTION

Casseroles, which typically consist of a combination of vegetables, meat, pasta and/or rice, are cooked and served in a single large, deep dish. Casseroles are often topped with cheese as the primary surface ingredient. Due to the depth of a casserole, it can be difficult to cook the center of the casserole thoroughly, without excessively browning or burning the surface ingredients. Thus, casseroles are typically cooked for longer times and at lower temperatures as compared to the individual ingredients cooked alone.

Casseroles are currently prepared in an oven to achieve some browning of the casserole. During the browning process, also known as the Maillard reaction, reducing sugars and amino acids react at temperatures usually in the range of about 300-500° F. and break down relatively large, dull tasting molecules into relatively small, volatile molecules having a pleasing taste and odor. Thus, the browning process gives the casserole a desired flavor in addition to changing the color of the surface of the casserole. Browning occurs only at the surface because the moisture in the casserole prevents the interior from reaching temperatures required for the Maillard reactions to take place. The browning Maillard reaction, however, cannot occur at the surface of the casserole in an overly humid cooking cavity. As a result, casseroles are typically cooked without the addition of moisture. However, the longer cook times required for casseroles expose the surface ingredients of the casserole to radiant heat that can dry out, overbrown and even burn the surface ingredients. To prevent this, casseroles are covered with foil for part of the baking time. This is inconvenient and users often forget to remove the foil and the surface ingredients are not browned as desired.

The addition of water onto the surface ingredients can slow the surface browning. However, current methods of applying water to the surface ingredients by direct spray or steam are not convenient for the user nor do they produce predictable results. If too much water is used, the surface ingredients may appear uncooked and be soggy. If too little is used, the surface ingredients may burn.

SUMMARY OF THE INVENTION

The invention relates to a method of operating a household oven to bake a casserole with the introduction of steam and controlling the steam to maintain a predetermined level of humidity to control the level of browning of the casserole.

DESCRIPTION OF THE PREFERRED EMBODIMENT

Figure 1:
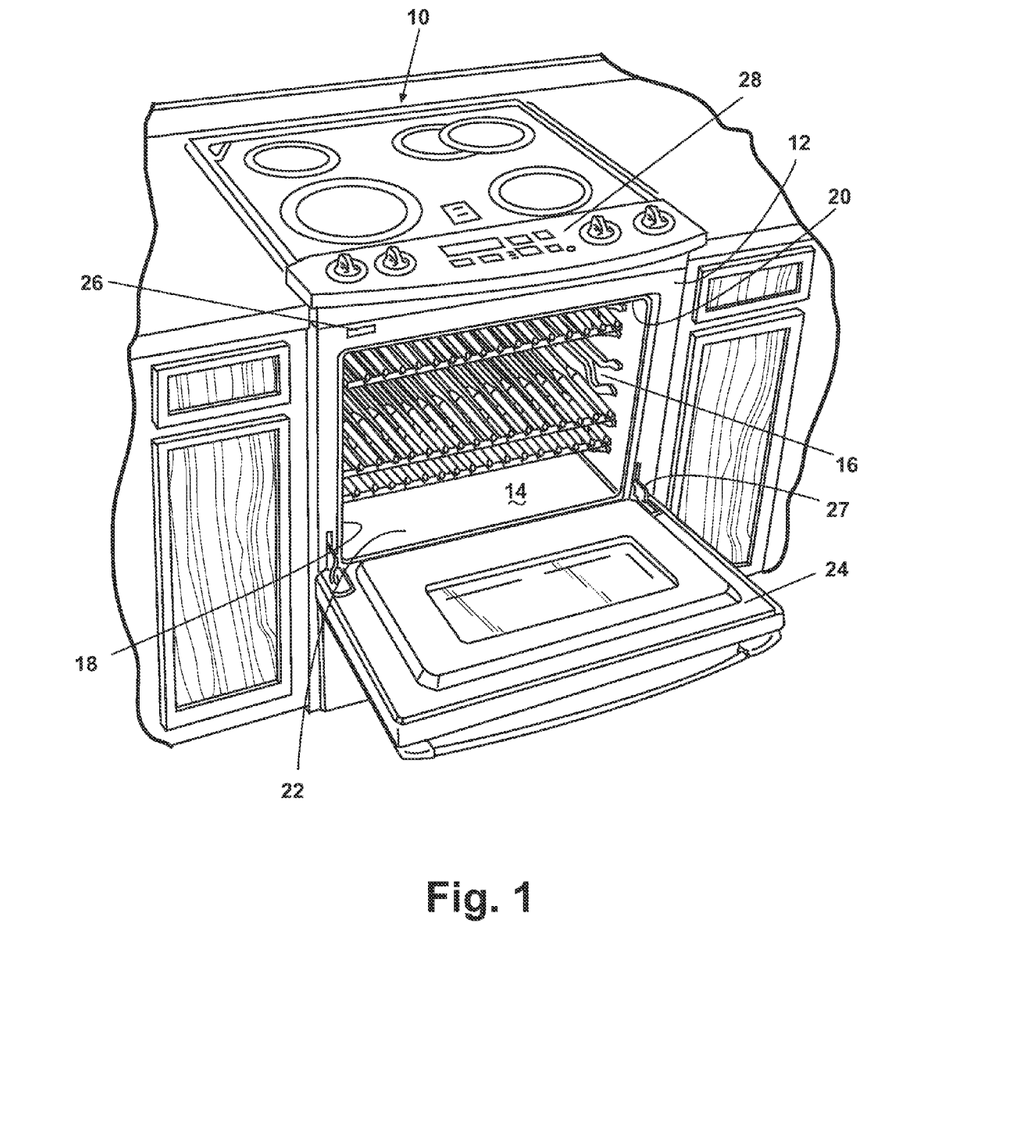
FIG. 1 is a perspective view of an exemplary automatic household oven.
Figure 2:
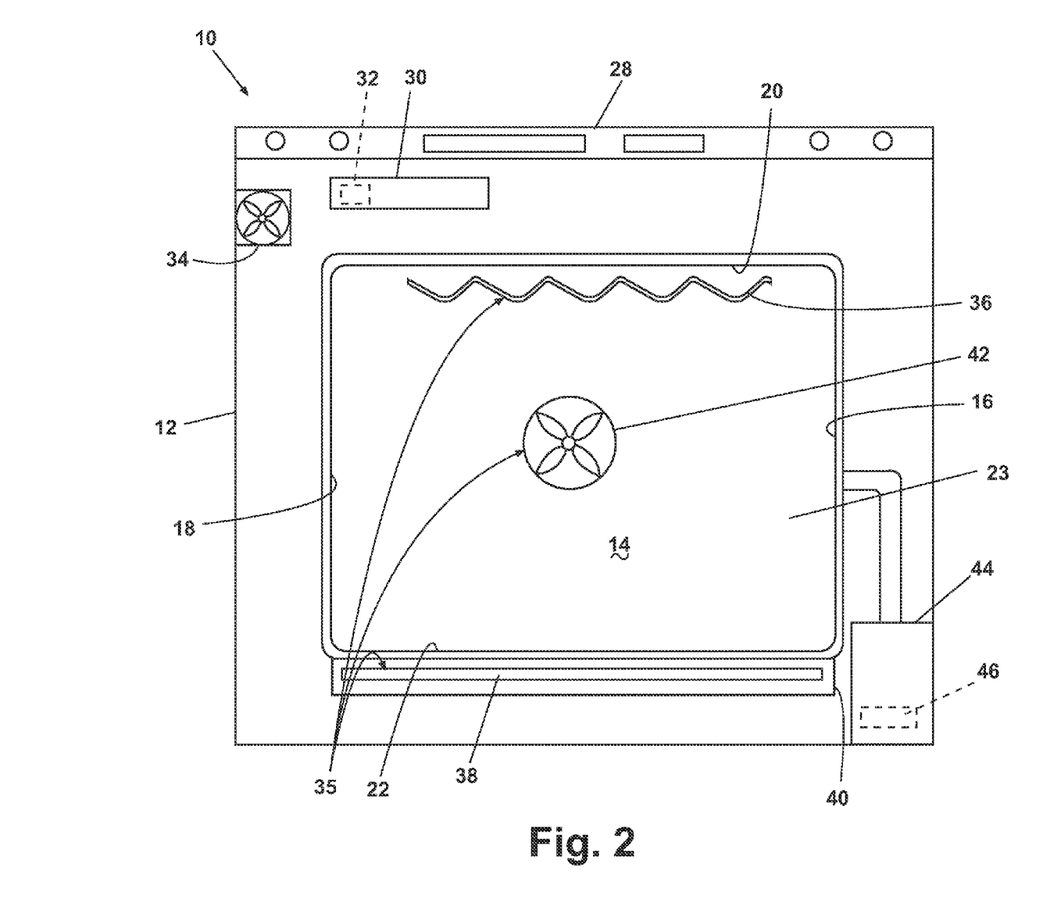
FIG. 2 is a schematic view of the oven of FIG. 1.

Referring now to the figures, FIG. 1 illustrates an exemplary automatic household oven 10 that can be used to implement a method for baking casseroles with steam according to one embodiment of the invention. The oven 10 comprises a cabinet 12 with an open-face cooking cavity 14 defined by cooking cavity walls: a pair of spaced side walls 16, 18 joined by a top wall 20, a bottom wall 22, and a rear wall 23 (FIG. 2). A door 24 pivotable at a hinge 27 selectively closes the cavity 14, and a sensor 26 detects an open position of the door 24 and a closed position of the door 24. When the door 24 is in the open position, a user can access the cavity 14, while the door 24 in the closed position prevents access to the cavity 14 and seals the cavity 14 from the external environment.

The oven 10 further comprises a control panel 28 accessible to the user for inputting desired cooking parameters, such as temperature and time, of manual cooking programs or for selecting automated cooking programs. The control panel 28 communicates with a controller 30 located in the cabinet 12, as shown in FIG. 2. The controller 30 can be a proportional-integral-derivative (PID) controller or any other suitable controller, as is well-known in the automatic oven art. The controller 30 stores data, such as default cooking parameters, the manually input cooking parameters, and the automated cooking programs, receives input from the control panel 28, and sends output to the control panel 28 for displaying a status of the oven 10 or otherwise communicating with the baker. Additionally, the controller 30 includes a timer 32 for tracking time during the manual and automated cooking programs and a cooling fan 34 located in the cabinet 12 for drawing cooling air into the cabinet 12 and directing the air toward the controller 30 to avoid overheating of the controller 30 by heat conducted from the cavity 14. The cooling air flows around the outside of the cooking cavity walls 16, 18, 20, 22, 23.

With continued reference to FIG. 2, the oven 10 further comprises a heating system 35 having an upper heating element 36, commonly referred to as a broiler, and a lower heating element 38. The schematic illustration of the FIG. 2 shows the lower heating element 38 as being hidden or mounted beneath the cooking cavity bottom wall 22 in a heating element housing 40. Heat from the lower heating element 38 conducts through the bottom wall 22 and into the cavity 14. Alternatively, the lower heating element 38 can be mounted inside the cavity 14, as is well-known in the oven art. Further, the upper and lower heating elements 36, 38 can be mounted at the side walls 16, 18 of the cavity 14, as disclosed in U.S. Pat. No. 6,545,251 to Allera et al., which is incorporated herein by reference in its entirety. The heating system 35 according to the illustrated embodiment further comprises a convection fan 42 that circulates air and steam, when present, within the cavity 14. The convection fan 42 can be any suitable fan and can be mounted in any suitable location of the cavity 14, such as in the rear wall 23.

In addition to the heating system, the oven 10 comprises a steam system 44 preferably mounted within the cabinet 12 and configured to introduce steam into the cavity 14. The steam system 44 in the illustrated embodiment comprises a boiler 46 that heats water stored in the steam system 44. However, the steam system 44 can be any suitable system that is capable of introducing steam directly into the cavity 14 or introducing water that is turned into steam in the cavity 14 and is not limited to the system shown schematically in FIG. 2.

Figure 3:
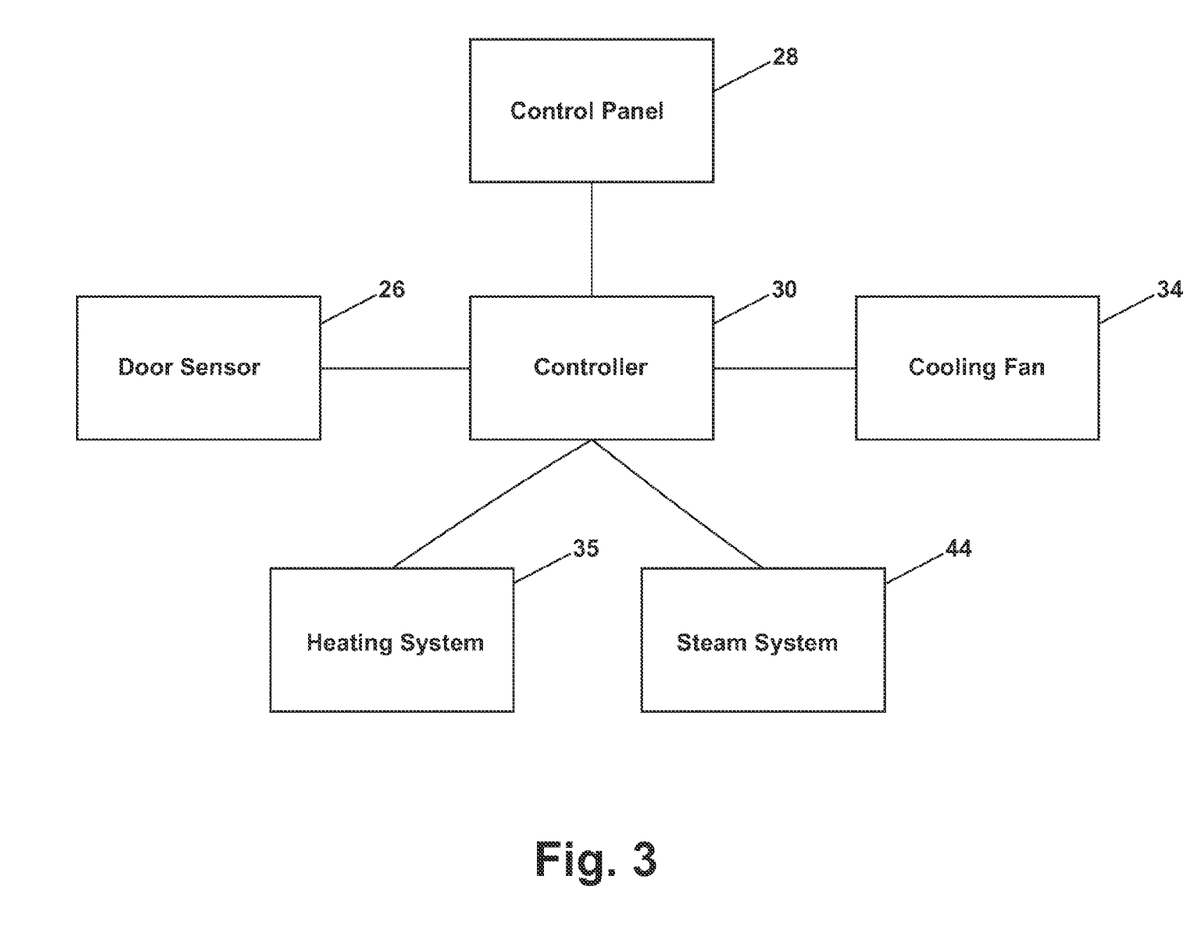
FIG. 3 is a schematic diagram illustrating a controller of the oven of the FIG. 1 and exemplary components in operative communication with the controller for executing a method of baking a casserole according to one embodiment of the invention.

FIG. 3 is a block diagram that schematically illustrates a control system of the oven 10. The control system comprises the controller 30, which operably communicates with the control panel 28, as described above, the door sensor 26, the cooling fan 34, the heating system 35, and the steam system 44. The door sensor 26 communicates to the controller 30 the open or closed position of the door 24, and the controller 30 communicates with the cooling fan 34 to activate or deactivate the cooling fan 34 to control the temperature of the controller 30. The controller 30 instructs the heating system 35 to activate or deactivate the upper heating element 36, the lower heating element 38, and the convection fan 42, either all together, individually, or in groups, and provides instructions regarding the desired temperature of the cavity 14 and the rate at which the heating system 35 heats the cavity 14. Similarly, the controller 30 instructs the steam system 44 to activate or deactivate the boiler 46 and provides instructions regarding the desired temperature of the water in the steam system 44 in order to achieve the desired relative humidity in the cavity 14.

As stated above, the exemplary oven 10 can be used to implement a method 50 of baking a casserole with steam according to one embodiment of the invention. The method 50 comprises several stages during which the heating system 35 operates to control a temperature of the cavity 14 and the steam system 44 operates to control a relative humidity of the cavity 14. The temperature and the relative humidity during the stages are selected to produce a casserole having desired outer and inner characteristics, such as texture and color. As used herein, the term "casserole" refers to any type of casserole that benefits from steam baking. Examples of casseroles include, but are not limited to, green bean casserole, tamales casserole, chicken casserole, enchiladas casserole, and tuna casserole. A casserole can also be a standard casserole, which has no toppings, or it can be a cheese-covered casserole having a layer of cheese on a top portion thereof. Furthermore, the method for baking a casserole according to the invention is also useful for cooking egg and cheese dishes, such as quiches.

Figure 4:
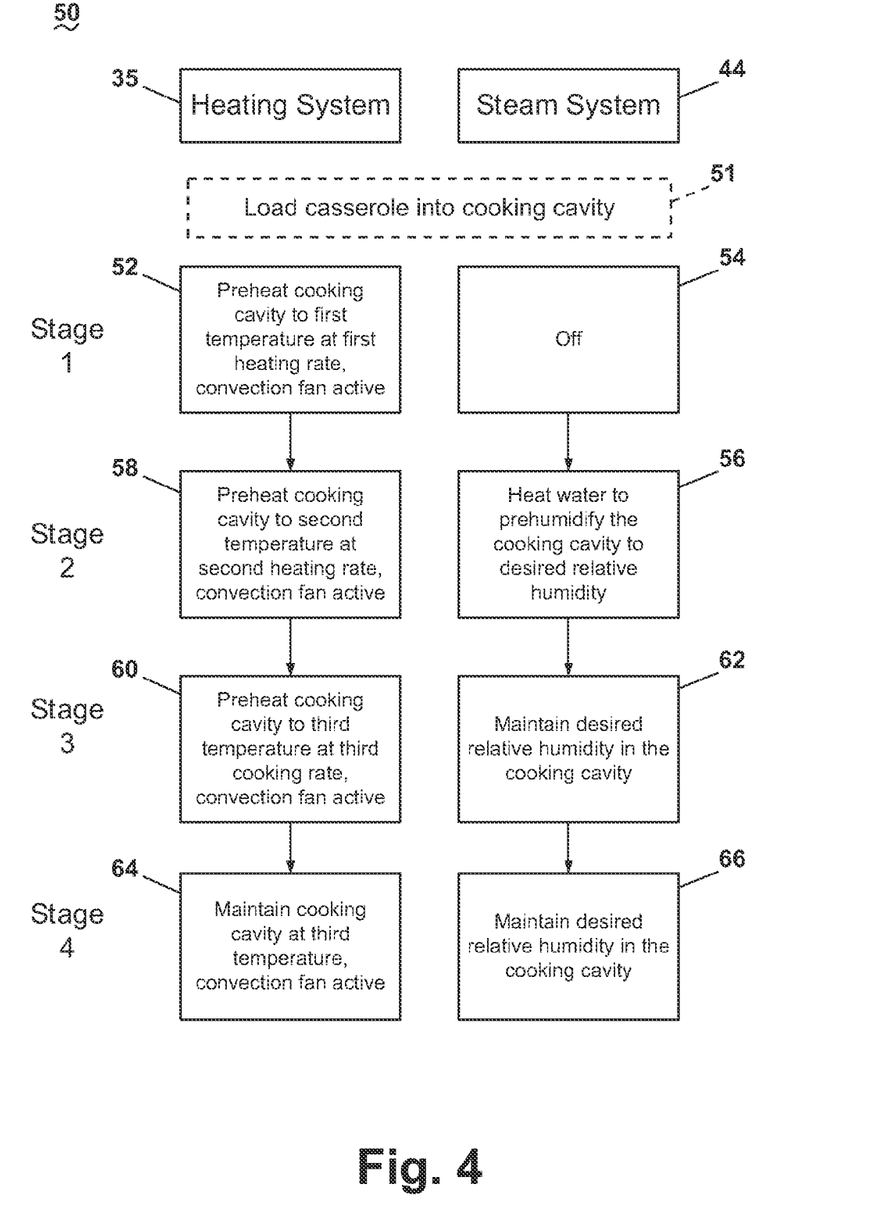
FIG. 4 is a schematic diagram illustrating a method of baking a casserole according to one embodiment of the invention.
Figure 5:
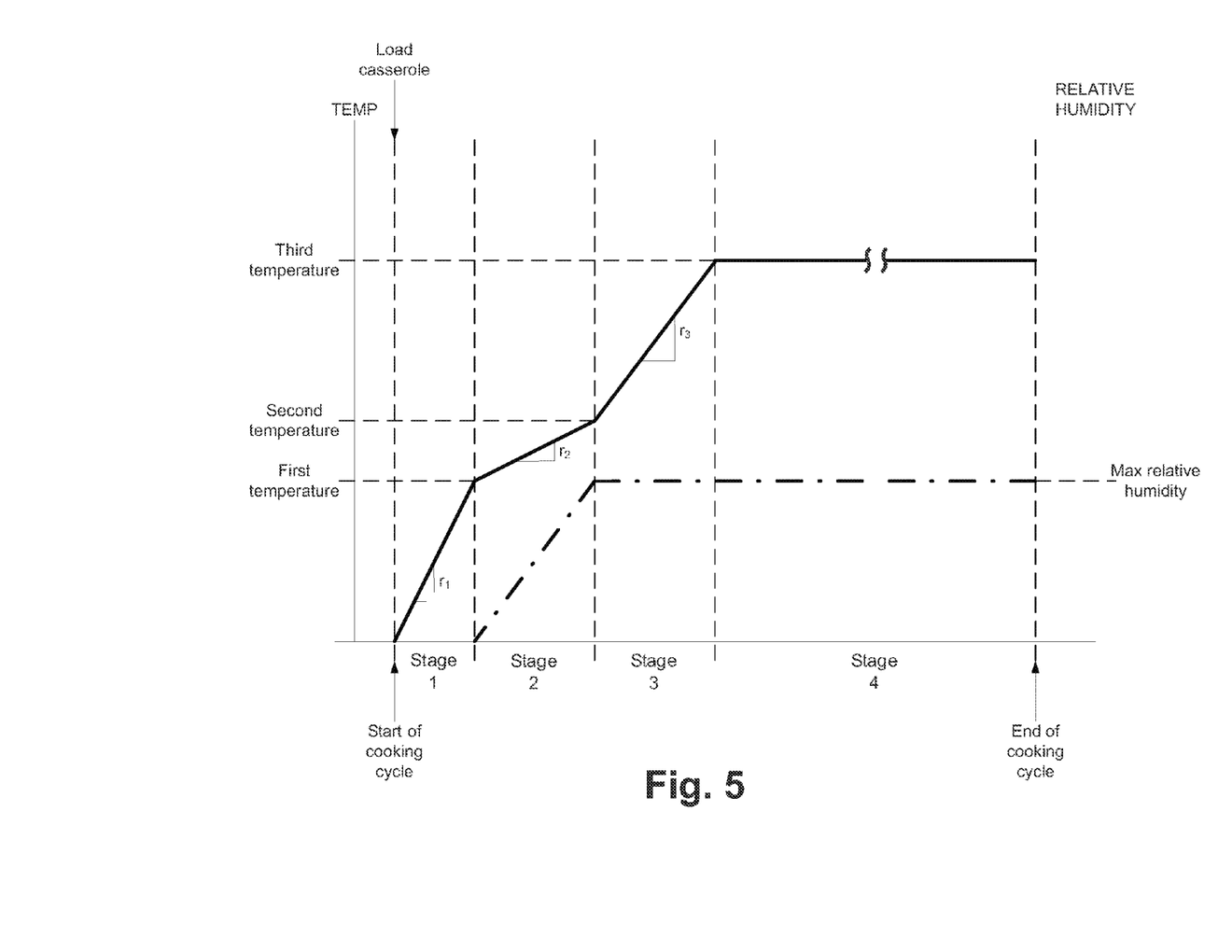
FIG. 5 is a schematic graph illustrating a temperature and a relative humidity in a cooking cavity of the oven of FIG. 1 during the execution of the method of baking a casserole shown in FIG. 4.

The stages of the method 50 according to one embodiment of the invention are shown in a flow chart in FIG. 4, which presents the functions of the heating system 35 and the steam system 44 during each stage of the method 50, and the corresponding temperature of the cavity 14 and the relative humidity of the cavity 14 for the stages are schematically illustrated in FIG. 5. FIG. 5 is not intended to report actual behavior of the temperature and the relative humidity during the method 50; rather, FIG. 5 represents a general behavior of these properties. It will be apparent to one of ordinary skill in the oven art that, in reality, the actual temperature and the actual relative humidity fluctuate about a target temperature and a target relative humidity during the operation of an oven.

Before the first stage of the method 50, the baker prepares the casserole and places the casserole and a corresponding casserole support, such as a baking stone or a baking tray, if used, into the cavity 14, as indicated by step 51 in FIG. 4. In general, stage 1 can be referred to as a dry preheat stage where the heating system 35 heats the cavity 14 to a first temperature at a first heating rate $r_1$ (step 52), and the steam system 44 is off or not activated (step 54). The dry preheat stage raises the temperature of all exposed surfaces in the oven 10 to a level sufficient for preventing steam from condensing. According to one embodiment of the invention, the first temperature is a temperature about equal to the boiling point of water. The first temperature is at least equal to about the boiling point of water so that steam entering the cavity 14 during stage 2 will maintain a vapor phase (or water entering the cavity 14 will undergo a phase change to vapor, if the steam system 44 introduces water into the cavity 14). The first heating rate is relatively high so as to flash heat the cavity 14 whereby the cavity 14 quickly reaches the first temperature. Flash heating comprises heating the cavity 14 rapidly, such as by heating the cavity 14 as fast as possible or at a rate to minimize the time required for the cavity 14 to reach the first temperature. The convection fan 42 is also operated during stage 1, as is indicated in step 52. Stage 1 terminates when the cavity 14 reaches the first temperature or after a predetermined period of time. Waiting until the end of stage 1 to initiate the steam system 44 ensures that the temperature of the cavity 14 is high enough to sustain steam in a vaporized state. As a result, the vapor will not condense in the cavity 14 and form water droplets on the walls 16, 18, 20, 22, 23, the casserole, or any other items in the cavity 14. Formation of water droplets on porcelain, which is a material found on the cavity walls 16, 18, 20, 22, 23 of many ovens, can undesirably damage or stain the material.

Stage 2 follows stage 1 and can be generally referred to as a prehumidify stage where the steam system 44 activates to heat the water, such as by the boiler 46, to prehumidify the cavity 14 (step 56) while the heating system 35 continues to preheat the cavity 14. Stage 2 is designed to uniformly heat the casserole and the interior of the oven 10 in order to prevent uneven cooking of the casserole. When the water in the steam system 44 reaches its boiling point, the steam begins to enter the cavity 14 and raises the relative humidity in the cavity 14. According to one embodiment of the invention, the relative humidity of the cavity 14 reaches a desired relative humidity during stage 2 or at least by the end of stage 2. Thus, by the end of stage, 2, the cavity 14 is moist, a condition where the relative humidity of the cavity 14 is greater than the relative humidity of the cavity 14 prior to the introduction of steam and is at a level desired for initial baking of the casserole. The convection fan 42 continues to operate during stage 2. Concurrently, the heating system 35 raises the temperature of the cavity 14 to a second temperature at a second heating rate $r_2$ less than the first heating rate (step 58). According to one embodiment of the invention, the second temperature is just below a minimum desired steam baking temperature, as will be discussed in more detail hereinafter. The second heating rate is relatively low so that the temperature of the cavity 14 slowly approaches the second temperature to avoid exposing the casserole to excessive direct radiation and to ensure that the cavity 14 is uniformly heated. The term "uniformly heated" refers to all spaces and walls 16, 18, 20, 22, 23 of the cavity 14 and items, such as baking racks, baking stones, and baking trays, in the cavity 14 achieving the first temperature. A uniformly heated cavity results in a higher quality casserole item with consistent final characteristics. When the cavity 14 is uniformly heated and the baker opens and closes the door 24, the temperature of the cavity 14 almost immediately returns to the temperature of the cavity 14 prior to the opening of the door 24.

When stage 2 ends, either upon the cavity 14 reaching a desired relative humidity, such as a maximum relative humidity, or the second temperature, or after a predetermined period of time, stage 3 begins. During stage 3, the duty cycles of the upper and lower heating elements 36, 38 remain the same as in stage 2 to increase the temperature of the cavity 14 to a third temperature (step 60) at a third heating rate $r_3$ optionally greater than the second heating rate and less than the first heating rate, the convection fan 42 continues to operate, and the steam system 44 maintains the desired relative humidity (step 62). According to one embodiment of the invention, the third temperature is equal to a set temperature, which can be a temperature entered by a user through a user interface on the control panel 28 or set by the automatic cooking program, and is at least equal to the minimum desired steam baking temperature. The user interface can comprise, for example, a button, a touch pad, a touch screen, or a voice command unit. Stage 3 is used to heat the oven to the proper cooking temperature so that the casserole can be properly cooked during stage 4.

When the temperature of the cavity 14 reaches the third temperature or after a predetermined period of time, stage 4 begins. During stage 4, the heating system 35 maintains the temperature of the cavity 14 at the third temperature (step 64), and the steam system 44 maintains the desired relative humidity (step 66). Further, during stage 4, the convection fan 42 continues operation, as indicated in step 64. The convection fan 42 is active during all of the stages to help distribute the air and steam throughout the cavity 14. The duration of stage 4 can be variable and dependent on a user input cooking cycle time. In this circumstance, the duration of stage 4 is equal to the user input cycle time less the combined duration of stages 1-3. If the user input cycle time is less than the combined duration of stages 1-3, stage 4 can be eliminated, and the duration of stage 3 can be adjusted in accordance with the user input cycle time. Alternatively, the duration of stage 4 can be set by an automatic cooking cycle.

An exemplary implementation of the method 50 with the oven 10 described above, along with exemplary operational parameter values, is presented below, with it being understood that the method 50 can be utilized with any suitable household oven 10 and that the implementation of the method 50 with different ovens can differ according to the oven utilized. The exemplary operational parameter values are shown in a table in FIG. 6. The exemplary parameters are designed for baking a standard casserole.

During stage 1, the heating system 35 rapidly heats the cavity 14 to about 212° F., the boiling point of water at sea level. As is well known in the chemistry art, the boiling point of water changes with altitude and solute content, and the first temperature can be adjusted accordingly. The duration of stage 1 is about 4 minutes; thus, the first heating rate is about 35° F. per minute if the cavity 14 reaches the 212° F. at the end of the 4 minutes. However, the cavity 14 can reach the first temperature before the end of the 4 minutes, if desired. The controller 30 instructs the heating system 35 to operate the upper heating element 36 at a 65% duty cycle and the lower heating element 38 at a 100% duty cycle and to activate the convection fan 42. An exemplary duty cycle is the percentage of time the heating element is on (i.e., power is supplied to the heating element) during a certain time interval, such as 1 minute. The duty cycle of the upper heating element 36 is lower than that of the lower heating element 38 to avoid overheating and excessively browning the exposed upper surface of the casserole that is already present in the cavity 14.

After the 4 minutes, stage 2 begins, and the controller 30 instructs the heating system 35 to reduce the duty cycles of the upper and lower heating elements 36, 38 to 35% and 65% duty cycles, respectively, to slowly increase the temperature to about 250° F. The duration of stage 2 is about 6 minutes; thus, the first heating rate is slightly greater than 6° F. per minute if the temperature of cavity 14 reaches about 250° F. at the end of the 6 minutes. As with stage 1, the temperature in the cavity 14 can reach the second temperature prior to the end of the 6 minutes, if desired. Additionally, the steam system 44 communicates with the controller 30 and turns on the boiler 46 for operation at an 80% duty cycle to raise the relative humidity in the cavity 14 to the desired relative humidity, which is less than a maximum humidity. As with the heating elements 36, 38, an exemplary duty cycle for the boiler 46 is the percentage of time the boiler 46 is on (i.e., power is supplied to the boiler 46) during a certain time interval, such as 1 minute.

During stage 3, the duty cycles of the upper and lower heating elements 36, 38 remain the same as in stage 2 while increasing the temperature of the cavity 14 to the third temperature, which, according to one embodiment of the invention, is a set temperature. The set temperature is a temperature at which the casserole is baked following the preheating and usually ranges between about 300° F., the minimum desired steam baking temperature according to one embodiment of the invention, and 450° F. The duration of stage 3 is about 6 minutes, and the cavity 14 can reach the set temperature before the end of the 6 minutes and at least by the end of the 6 minutes. Further, the duty cycle of the boiler 46 remains at 80%.

After the 6 minutes of stage 3, the controller initiates stage 4, which has a variable duration that depends on the user input cooking cycle time, as described above.

Figure 6:
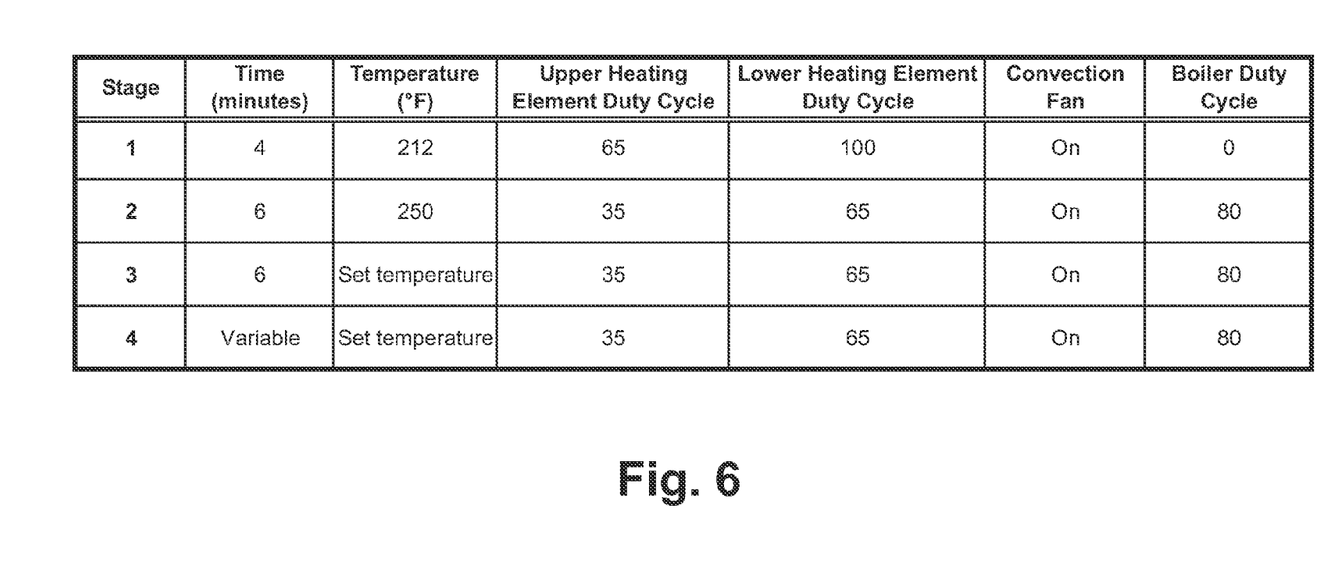
FIG. 6 is a table of exemplary parameters for implementation of the method of baking a casserole shown in FIGS. 4 and 5 at a first relative humidity.

As mentioned above, the operational parameter values shown in FIG. 6 are dependent on the oven 10 utilized to implement the method. Different ovens have different types of heating systems (e.g., some ovens do not have the convection fan 42) and steam systems, which affect the implementation of the method 50. For example, the above operational parameter values were determined with the cooling fan 34 operational during the entire cooking cycle. Because the cooling fan can draw away heat from the cooking cavity 14 though the cooking cavity walls 16, 18, 20, 22, 23, the cooling fan can affect the temperature of the cavity 14.

Figure 7:
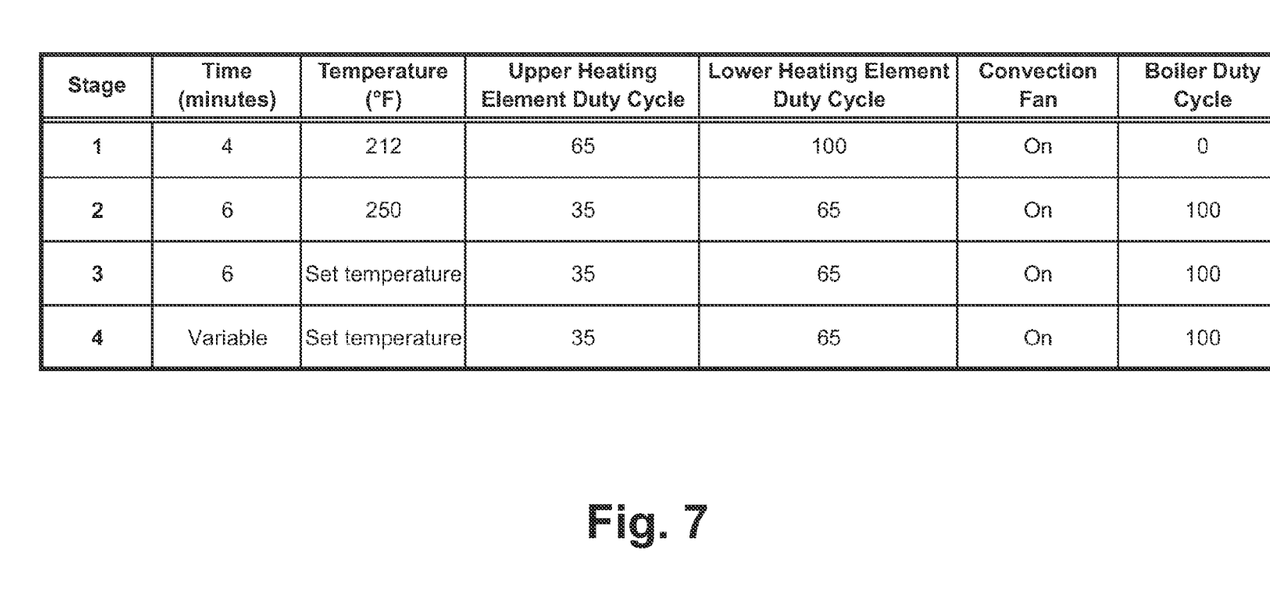
FIG. 7 is a second table of exemplary parameters for implementation of the method of baking a casserole shown in FIGS. 4 and 5 at a second relative humidity.

FIG. 7 illustrates another table of exemplary operational parameter values. The exemplary parameters of FIG. 7 are designed for baking a cheese-covered casserole, which typically requires a higher relative humidity to keep the cheese moist and prevent burning. In this particular example, the exemplary operational parameter values are the same as those used for baking a standard casserole, except the desired relative humidity is the maximum relative humidity. The maximum relative humidity is achieved by operating the boiler 46 at a 100% duty cycle. Alternatively, the desired relative humidity can be less than the maximum relative humidity. When cooking a cheese-covered casserole, the desired relative humidity is preferably achieved by operating the boiler 46 at a duty cycle in the range of 80% to 100%.

When the baker desires to bake a cheese-covered casserole using the method 50, the baker prepares the casserole, opens the door 24, places the casserole along with the casserole support, if used, in the cavity 14, and closes the door 24. Next, the user selects a "CASSEROLE" cooking cycle, or, alternatively, a "CHEESE CASSEROLE" cooking cycle, on the oven 10 through the control panel 28. The baker also enters the set temperature, desired relative humidity, and the cooking cycle time, if needed, through the control panel 28. The oven 10 then implements the method 50, beginning at stage 1 and ending at stage 4 or stage 5. Following stage 5, the baker removes the casserole, which has the desired outer and inner characteristics, such as texture and color, from the cavity 14. Thus, the casserole is baked in a controlled steam environment, and the baker does not have to attend to the casserole during the baking process nor execute any dangerous home remedies to introduce steam into the cavity 14.

FIGS. 8-11 illustrate the results achieved by cooking cheese-covered casseroles covered with a variety of different types of cheeses according to the method 50. Eight different casseroles were prepared for cooking. Four types of cheeses—cheddar, mozzarella, parmesan, and, for comparison, reduced fat cheddar—were used to cover the casseroles such that each type of cheese was used to cover two casseroles. The cheese-covered casseroles were then cooked such that four of the cheese-covered casseroles each having a different type of cheese were cooked at an 80% steam duty cycle. The remaining four cheese-covered casseroles were cooked at a 100% steam duty cycle. The different steam generator duty cycles provide different relative humidity within the cooking cavity, which can be quantified by comparing the wet bulb and dry bulb temperatures. The greater the difference between the dry and wet bulb temperatures, the lower the relative humidity.

Measurements of a dry bulb temperature and a wet bulb temperature were taken throughout the cooking process at three different dry bulb temperatures: 300° F., 337.5° F., and 375° F. The dry bulb temperature is the temperature of the air in the cooking chamber measured using a thermometer unaffected by moisture in the air. The wet bulb temperature is the temperature of the air in the cooking chamber measured using a thermometer affected by moisture in the air. The wet bulb temperature measured at any time will always be less than the temperature measured by the dry bulb, and the difference between the wet bulb temperature and the dry bulb temperature at a given point during the cooking process is represented by the variable delta. Less relative humidity results in a greater difference between the dry bulb and wet bulb temperatures because the wet bulb is colder. Thus, delta increases as the relative humidity decreases.

In addition to measuring the dry bulb and wet bulb temperatures and calculating delta, each cheese-covered casserole was also visually observed at three points in the cooking process in order to determine a level of browning. The level of browning was noted at the same time that the dry bulb temperature and wet bulb temperatures were recorded. The level of browning is determined by visually comparing a color of the cheese to a level of browning scale, which is known in the art as the BSi Shade Gauge: 1998 scale. Each level of browning is identified by a number, and the numbers increase with the darkness of the color of the cheese. As the different types of cheeses are all initially different colors, the trends of these numbers with respect to delta and color are generally more representative of the cooking result than the absolute value of the numbers themselves.

Figure 8:
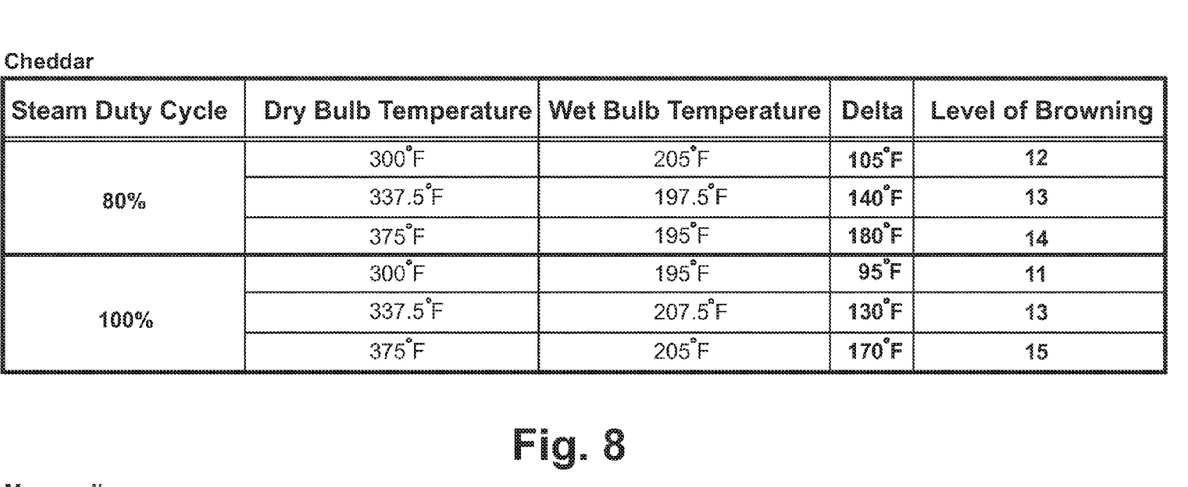
FIG. 8 is a table illustrating the relationships between steam duty cycles, dry bulb temperatures, wet bulb temperatures, delta, and the level of browning of the method of baking a cheddar-covered casserole shown in FIGS. 4 and 5.
Figure 9:
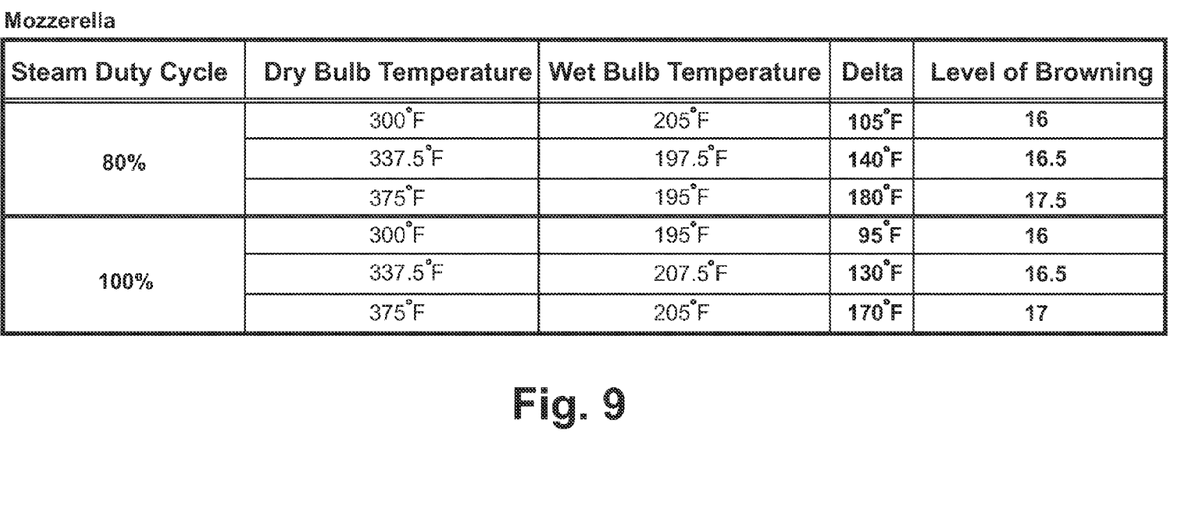
FIG. 9 is a table illustrating the relationships between steam duty cycles, dry bulb temperatures, wet bulb temperatures, delta, and the level of browning of the method of baking a mozzarella-covered casserole shown in FIGS. 4 and 5.
Figure 10:
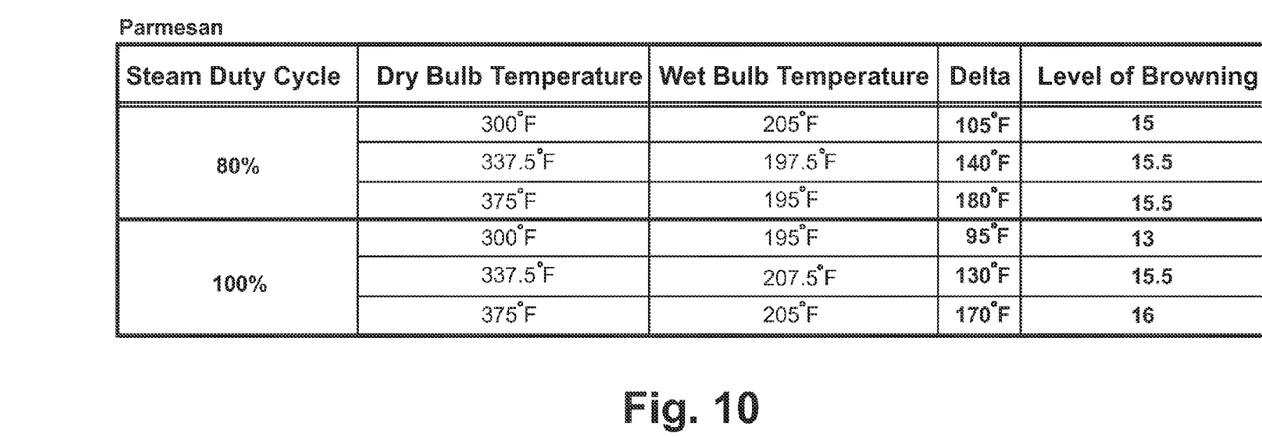
FIG. 10 is a table illustrating the relationships between steam duty cycles, dry bulb temperatures, wet bulb temperatures, delta, and the level of browning of the method of baking a parmesan-covered casserole shown in FIGS. 4 and 5.

With continuing reference to FIGS. 8-11, the level of browning increases as the difference or delta between the dry bulb and wet bulb temperatures increases when the casserole is covered with natural cheese such as cheddar, mozzarella, or parmesan. Since the relative humidity decreases as delta increases, there is less moisture in the air to keep the cheese moist during the cooking process, which causes the cheese to brown; this is shown in FIGS. 8-10. The duty cycle of the steam generating system can be selected to produce the desired relative humidity for the desired level of browning for a selected cooking temperature. The desired browning level can be automatically selected or set by selecting the cooking cycle. Alternatively, the level of browning can be selected by the user as an input to a parameter for the cooking cycle.

Figure 11:
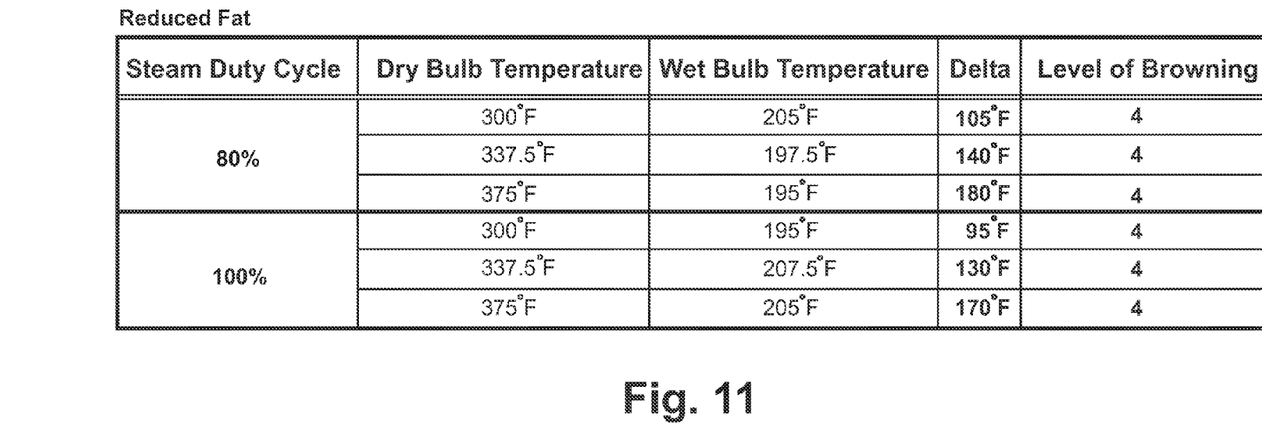
FIG. 11 is a table illustrating the relationships between steam duty cycles, dry bulb temperatures, wet bulb temperatures, delta, and the level of browning of the method of baking a reduced fat cheddar-covered casserole shown in FIGS. 4 and 5.

Reduced fat cheddar as shown in FIG. 11, did not show an increase in browning for the cook time, temperatures, and steam levels tested. The level of browning remained at a 4. It is believed that the increased water content in reduced fat cheese as compared to natural cheeses slows down the rate of browning. The internal water of the reduced fat cheese will need to be evaporated before the reduced fat cheese will start to brown. Thus, even less steam should increase the degree of browning. It is also believed that the reduced fat content inhibits the Malliard effect, which is the primary source of browning.

It is also believed that the described method is applicable to casseroles with surface ingredients other than cheese or in combination with cheese. Once the degree of browning is determined by the selected cycle or by the user, the duty cycle for the steam generator can be set by the controller to achieve the desired degree of browning for the given cook time that will ensure the casserole is properly cooked throughout while achieving the desired browning.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method of baking a casserole having a cheese topping using steam during a cooking cycle in an automated household oven with a cooking cavity, a heating system for heating the cooking cavity, a steam system for introducing steam into the cooking cavity, and a controller for controlling an operation of the heating system and the steam system to implement the cooking cycle, the method comprising:

receiving an input to the controller of a desired level of browning for the cheese topping of the casserole;

receiving an input to the controller of a cooking temperature for the casserole;

determining by the controller an output of the steam system to obtain the desired level of browning based on the received input of the desired level of browning;

operating the heating system to preheat the cooking cavity to a preheating temperature above the boiling point of water;

after the preheating of the cooking cavity, operating the heating system to heat the cooking cavity at the cooking temperature to cook the casserole;

operating the steam system to boil water and produce steam at the determined output during the cooking of the casserole to control a level of browning of the cheese topping of the casserole based on the input to the controller of a desired level of browning; and wherein the operation of the heating system at the cooking temperature and the operation of the steam system at the determined output serves to generate a casserole having a desired inner characteristic and the desired level of browning for the cheese topping of the casserole.

2. The method of claim 1 wherein the receiving an input to the controller of a desired level of browning comprises receiving an input from a user of the household oven.

3. The method of claim 1 wherein the receiving an input to the controller of the cooking temperature comprises receiving an input from a user of the household oven.

4. The method of claim 1 wherein determining an output of the steam system comprises setting a duty cycle of the steam system.

5. The method of claim 4 wherein the setting the duty cycle comprises setting the duty cycle based on at least one of the cooking temperature, the desired level of browning for the cheese topping of the casserole or a cooking time.

6. The method of claim 1 wherein receiving an input to the controller of a cooking temperature comprises receiving one of a cooking cycle or at least one cooking parameter of the cooking cycle.

7. The method of claim 1, further comprising receiving an input to the controller of a cooking time for the casserole.

8. The method of claim 7 wherein receiving an input to the controller of the cooking time comprises one of receiving a cooking cycle or at least one cooking parameter of the cooking cycle.

9. The method of claim 1 wherein determining an output of the steam system is a function of at least one of the cooking temperature or a cooking time.

10. The method of claim 1 wherein receiving an input to the controller of the desired level of browning comprises receiving one of a cooking cycle or at least one cooking parameter of the desired level of browning.

11. The method of claim 1 wherein operating the heating system to heat the cooking cavity comprises operating at least one of an upper heating element or a lower heating element to heat the cooking cavity to cook the casserole.

12. The method of claim 11, further comprising operating the upper heating element at a first duty cycle and operating the lower heating element at a second duty cycle greater than the first duty cycle to control the level of browning of the cheese topping of the casserole.

13. The method of claim 1, wherein the output of the steam system is controlled by controlling a duty cycle of a steam generator.

14. The method of claim 1, further comprising operating the heating system during a first preheating step to preheat the cooking cavity to a first temperature greater than a water vapor phase change temperature in the cooking cavity before operating the heating system to heat the cooking cavity at the cooking temperature.

15. The method of claim 14, further comprising operating the heating system during a second preheating step to preheat the cooking cavity to a uniform temperature greater than the first temperature after the first preheating step and before operating the heating system to heat the cooking cavity at the cooking temperature.

16. The method of claim 15 wherein the operating the heating system during the second preheating step comprises preheating the cooking cavity to a second temperature less than the cooking temperature.

17. The method of claim 15 wherein the operating the steam system at the determined output occurs during at least a portion of the second preheating step.

18. The method of claim 15, further comprising operating the heating system during a third preheating step to preheat the cooking cavity to the cooking temperature after the second preheating step.

19. The method of claim 18 wherein the third preheating step further comprises operating the steam system at the determined output.

20. A method of baking a casserole having a cheese topping using steam during a cooking cycle in an automated household oven with a cooking cavity, a heating system for heating the cooking cavity, a steam system for introducing steam into the cooking cavity, and a controller for controlling an operation of the heating system and the steam system to implement the cooking cycle, the method comprising:

receiving an input to the controller of a desired level of browning for the cheese topping of the casserole;

receiving an input to the controller of a cooking temperature for the casserole;

determining by the controller an output of the steam system to obtain the desired level of browning based on the received input of the desired level of browning;

operating the heating system to heat the cooking cavity at the cooking temperature to cook the casserole;

operating the steam system to boil water and produce steam at the determined output during the cooking of the casserole to control a level of browning of the cheese topping of the casserole based on the input to the controller of a desired level of browning; and wherein the operation of the heating system at the cooking temperature and the operation of the steam system at the determined output serves to generate a casserole having a desired inner characteristic and the desired level of browning for the cheese topping of the casserole.

* * * * *